United States Patent [19]
den Hollander

[11] 4,002,965
[45] Jan. 11, 1977

[54] SYNCHRONIZED AND REGULATED POWER SUPPLY

[75] Inventor: Willem den Hollander, Schlieren, Switzerland

[73] Assignee: RCA Corporation, New York, N.Y.

[22] Filed: Aug. 25, 1975

[21] Appl. No.: 607,512

[30] Foreign Application Priority Data

June 10, 1975 United Kingdom ............ 24861/75

[52] U.S. Cl. .......................... 323/17; 178/DIG. 11; 323/DIG. 1
[51] Int. Cl.² ......................................... H04N 3/18
[58] Field of Search ............... 178/7.3 R, DIG. 11; 315/408, 411; 321/2; 323/17, 22 T, DIG. 1

[56] References Cited

UNITED STATES PATENTS

| | | | |
|---|---|---|---|
| 3,621,361 | 11/1971 | Barth | 323/DIG. 1 |
| 3,629,686 | 12/1971 | Hetterscheid et al. | 323/DIG. 1 |
| 3,733,540 | 5/1973 | Hawkins | 323/DIG. 1 |
| 3,742,371 | 6/1973 | Seibt et al. | 323/DIG. 1 |

*Primary Examiner*—A. D. Pellinen
*Attorney, Agent, or Firm*—Eugene M. Whitacre; Paul J. Rasmussen

[57] ABSTRACT

A switching regulator adapted to be coupled to a source of alternating current potential produces a direct current potential having an amplitude proportional to the duration of a first drive signal condition relative to the duration of a second drive signal condition. A modulator coupled to a synchronized oscillator produces a synchronized control signal having an amplitude proportional to the amplitude of the direct current potential. A drive signal generator coupled to the modulator and the switching regulator produces a first drive signal condition having a duration relative to the duration of the second drive signal condition which is proportional to the amplitude of the control signal, thereby providing for regulation of the direct current potential.

9 Claims, 22 Drawing Figures

SYNCHRONIZED AND REGULATED POWER SUPPLY

BACKGROUND OF THE INVENTION

The invention relates to a synchronized and regulated power supply.

In order to maintain optimum performance of the television receiver, it is desirable to provide a regulated direct current potential (B+) to the various circuits of the receiver. Numerous types of regulated power supply circuits have been used to provide the desired regulation. One such type is a switching regulator power supply.

A switching regulator power supply is a very efficient type of regulated power supply since the switching device is alternately turned off and on and the regulation is accomplished by controlling the relative durations of the off condition and the on condition of the switching device.

In order to minimize the interference produced by switching of the switching regulator power supply, it is desirable to synchronize the switching with the synchronizing signals utilized to synchronize the deflection circuits. In addition to the synchronizing signals, the B+ level must be coupled to the switching device to provide feedback to control the B+ level.

In television receivers, where it is desirable to isolate the chassis from the alternating current potential source having an earthen ground reference to prevent electrical shock to the operator, the coupling of B+ and synchronizing signals to the switching device requires numerous components or complicated construction of an isolation transformer.

Also, television receivers utilizing line rate deflection systems of the type disclosed in U.S. Pat. No. 3,452,244 employing two bidirectional conducting switches require an input reactor between the source of B+ and the commutating bidirectional conducting switch to prevent short circuiting of the B+ during the commutating interval (i.e., when the commutating switch is turned on).

SUMMARY OF THE INVENTION

In accordance with the invention, a synchronized and regulated power supply for a television receiver comprises a switching regulator means adapted to be coupled to a source of alternating current potential for producing a direct current potential having an amplitude proportional to the duration of a first drive signal condition relative to the duration of a second drive signal condition. Oscillating means adapted to be coupled to a source of synchronizing signals produces a switching signal having a first predetermined phase relationship with respect to the synchronizing signals. Modulating means coupled to the switching regulator means and the oscillating means produces a control signal having a second predetermined phase relationship with respect to the switching signal and having an amplitude which is proportional to the amplitude of the direct current potential. Means including a drive signal generator coupled to the modulating means and the switching regulator means initiates the production of the first drive signal condition in response to the initiation of the control signal and controls the duration of the first drive signal condition relative to the duration of the second drive signal condition in response to the amplitude of said control signal.

A more detailed description of the preferred embodiment of the invention is given in the following detailed description and the accompanying drawings of which.

DESCRIPTION OF THE INVENTION

Figure 1:
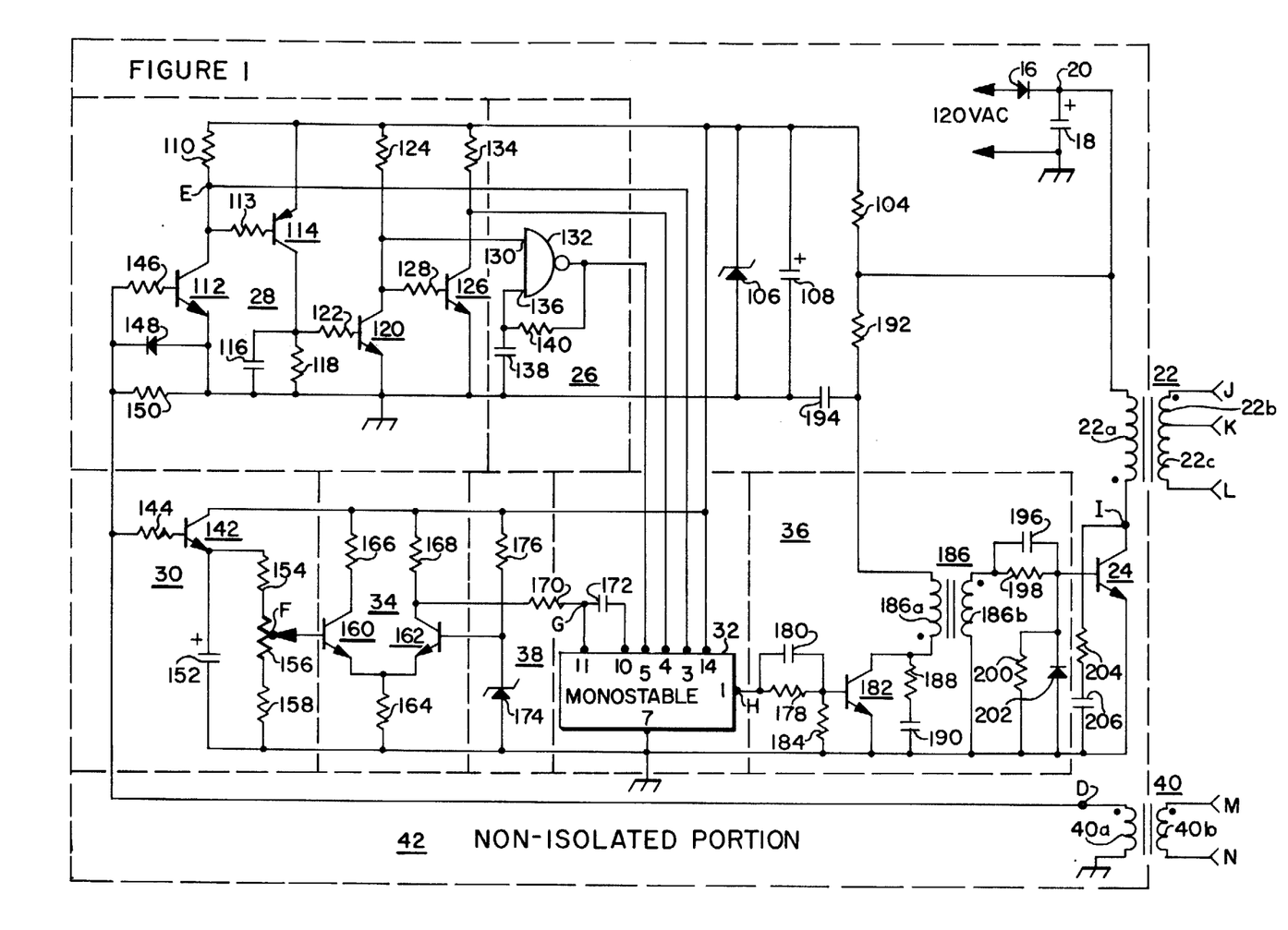
FIG. 1 is a schematic diagram, partially in block form, of a non-isolated portion of a synchronized and regulated power supply of a television receiver.
Figure 2:
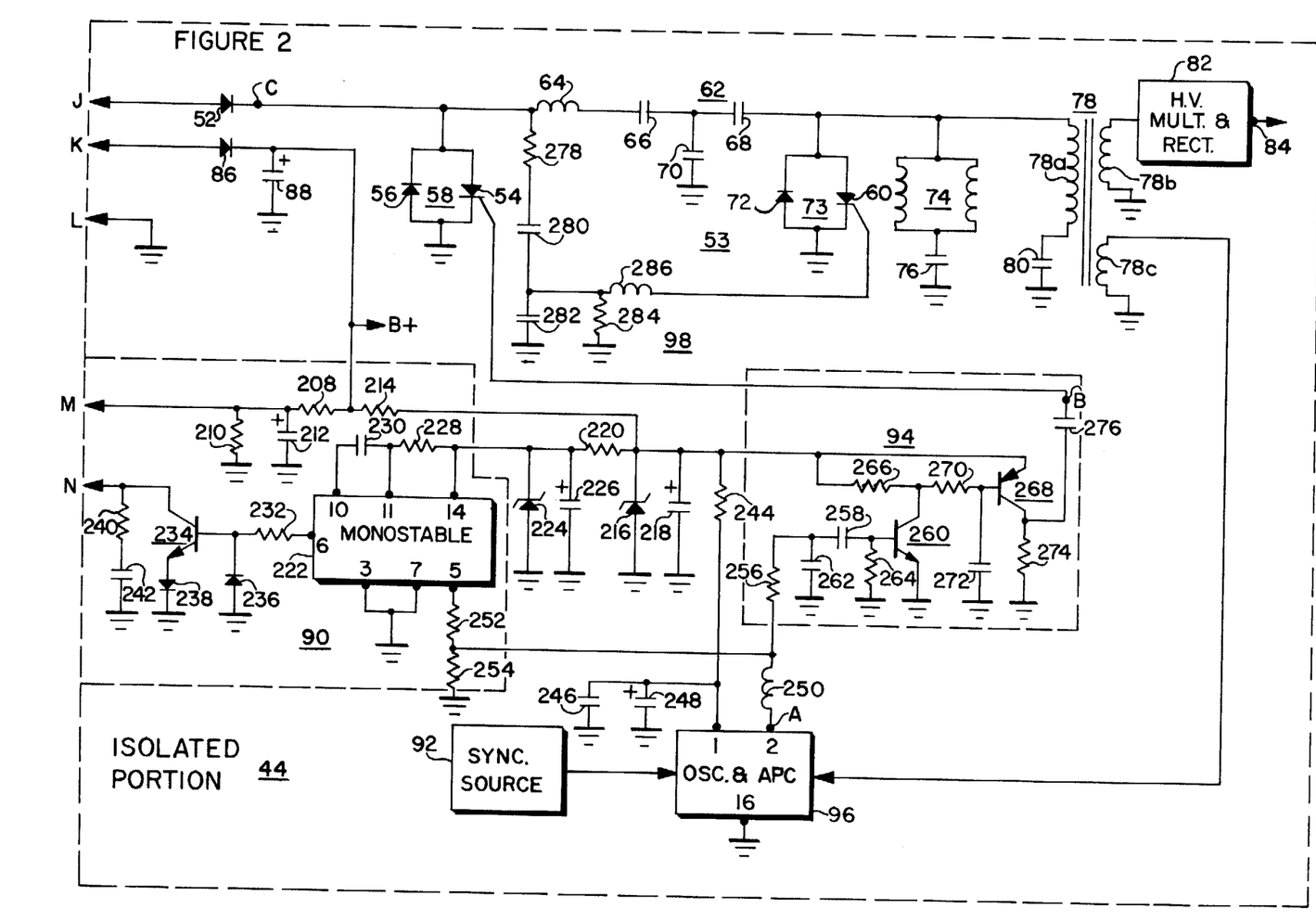
FIG. 2 is a schematic diagram, partially in block form, of a preferred embodiment of an isolated portion of the synchronized and regulated power supply of the television receiver.

FIG. 1 is a schematic diagram, partially in block form, of the non-isolated portion 42 of the television receiver of FIGS. 1 and 2. A source of alternating current (not shown), having an earthen ground reference, is coupled through a diode 16 to a filter capacitor 18 thereby providing for the development of a positive direct current potential at terminal 20 with respect to earthen ground. Terminal 20 is coupled through a winding 22a of an isolation transformer 22 to the collector electrode, designated as terminal I, of switching transistor 24. Winding 22a is magnetically coupled to and polarized as indicated by the polarizing dots with windings 22b and 22c of isolation transformer 22. A first terminal of winding 22b is designated as terminal J and another terminal of winding 22b is designated as terminal K. A first terminal of winding 22c is coupled to terminal K and another terminal of winding 22c is designated as terminal L. The emitter electrode of transistor 24 is coupled to earthen ground.

Terminal 20 is also coupled through a resistor 104 to the cathode of a zener diode 106. The anode of zener diode 106 is coupled to earthen ground. A filter capacitor 108 is coupled in parallel with zener diode 106. Zener diode 106 provides for a regulated potential at the cathode electrode with respect to earthen ground. The cathode of zener diode 106 is coupled through a collector resistor 110 to the collector electrode of transistor 112. The emitter electrode of transistor 112 is coupled to earthen ground. The collector electrode of transistor 112 is also coupled through a resistor 113 to the base electrode of a transistor 114 and a terminal 3 of a monostable 32. The emitter electrode of transistor 114 is coupled to the cathode electrode of zener diode 106. The collector electrode of transistor 114 is coupled through an integrating network comprising a capacitor 116 and a resistor 118 in parallel combination to earthen ground. The collector electrode of transistor 114 is also coupled to the base electrode of transistor 120 by means of a resistor 122. The emitter electrode of transistor 120 is coupled to earthen ground. The collector electrode of transistor 120 is coupled to the cathode of zener diode 106 by means of a resistor 124, to the base electrode of a transistor 126 by means of a resistor 128, and to a first gate 130 of a dual input NAND gate 132. The emitter electrode of transistor 126 is coupled to earthen ground and the collector electrode is coupled to the cathode of zener diode 106 by means of a resistor 134 and to a terminal 4 of monostable 32. Transistors 112, 114, 120 and 126, in conjunction with their associated circuitry, form a shaper and peak detector 28.

A second gate 136 of dual input NAND gate 132 is coupled through a capacitor 138 to earthen ground and to the output terminal of dual input NAND gate 132 by means of a resistor 140. Capacitor 138, resistor 140 and dual input NAND gate 132 form an auxiliary oscillator 26. The output terminal of dual input NAND gate 132 is coupled to terminal 5 of monostable 32.

The cathode of zener diode 106 is also coupled to pin 14 of monostable 32 and the collector electrode of a transistor 142. A terminal D of a winding 40a of an isolation transformer 40 is coupled through a resistor 144 to the base electrode of transistor 142, through a resistor 146 to the base electrode of transistor 112, and through a parallel combination of a protective and clamping diode 148 and a resistor 150 to earthen ground. Another terminal of winding 40a is coupled to earthen ground. Winding 40a of transformer 40 is magnetically coupled to and polarized as indicated by the polarizing dots with a winding 40b. A first terminal of winding 40b is designated as terminal M and another terminal is designated as terminal N.

The emitter electrode of transistor 142 is coupled to earthen ground by means of an integrating network comprising the parallel combination of a capacitor 152 and the series combination of a resistor 154, the resistive element of a potentiometer 156 and a resistor 158. The transistor 142 and the integrator form a peak detector 30.

The wiper terminal of potentiometer 156, designated as terminal F, is coupled to the base electrode of a transistor 160. The potentiometer provides for adjustment of the voltage at the base electrode of transistor 160 relative to the peak voltage at the base electrode of transistor 142. Transistor 160 operates in conjunction with a transistor 162 and associated circuitry to form a voltage comparator and differential amplifier 34. The emitter electrodes of transistors 160 and 162 are coupled to earthen ground by means of a resistor 164. The collector electrode of transistor 160 is coupled through a resistor 166 to the cathode electrode of zener diode 106, and the collector electrode of transistor 162 is coupled through a resistor 168 to the cathode electrode of zener diode 106. Connected in this manner, the voltage at the collector electrode of transistor 162 increases as the voltage at terminal F increases within a predetermined range of voltage determined by a reference voltage on the base electrode of transistor 162.

The collector electrode of transistor 162 is also coupled through a series combination of a resistor 170 and a capacitor 172 to terminal 10 of monostable 32. The resistor 170, the capacitor and the voltage at the collector of transistor 162 determine the width of the logic 0 portion of the drive pulse produced by monostable 32 at terminal 1. The junction of resistor 170 and capacitor 172, designated as terminal G, is coupled to terminal 11 of monostable 32. The base electrode of transistor 162 is coupled to the cathode of a zener diode 174 and coupled to the cathode of zener diode 106 by means of a resistor 176. The anode of zener diode 174 is coupled to earthen ground. The zener diode 174 and the resistor 176 form a reference source 38 and provide a relatively constant voltage at the base electrode of transistor 162 and thereby serves as a reference for the voltage comparator and differential amplifier 34.

The output terminal 1 of monostable 32, designated as terminal H, is coupled through a parallel combination of a resistor 178 and a capacitor 180 to the base electrode of a transistor 182. The base electrode of transistor 182 is also coupled through a resistor 184 to earthen ground. The emitter electrode of transistor 182 is coupled to earthen ground, and the collector electrode is coupled to a first terminal of a winding 186a of a driver transformer 186 and to earthen ground by means of a high frequency suppression network comprising a series combination of a resistor 188 and a capacitor 190 to earthen ground. The other terminal of winding 186a is coupled through a resistor 192 to terminal 20 and through a capacitor 194 to earthen ground.

Another winding 186b of driver transformer 186, polarized with respect to winding 186a as indicated by polarizing dots, has a first terminal coupled to earthen ground and another terminal coupled by means of a parallel combination of a capacitor 196 and a resistor 198 to the base electrode of transistor 24. The base electrode of transistor 24 is also coupled through a parallel combination of a resistor 200 and a protection diode 202 to earthen ground. The emitter electrode of transistor 24 is coupled to earthen ground and the collector electrode, designated as terminal I, is coupled to earthen ground by means of a high frequency suppression network comprising a series combination of a resistor 204 and a capacitor 206. The transistor 182 and associated circuitry comprises a driver network 36 which provides for power gain and polarity inversion of the signal developed at terminal H of monostable 32.

FIG. 2 is a schematic diagram, partially in block form, of a preferred embodiment of the isolated portion 44 of the synchronized and regulated power supply of the television receiver of FIGS. 1 and 2.

Terminal J of winding 22b is coupled to the anode electrode of a diode 52. The cathode electrode of diode 52, designated as terminal C, provides a pulsating direct current voltage to a deflection system 53 and is coupled to the anode electrode of an SCR 54 and to the cathode electrode of a damper diode 56. The SCR 54 and the damper diode 56 comprise a commutating switch 58. The cathode electrode of SCR 54 and the anode electrode of damper diode 56 are coupled to reference potential. Terminal C is also coupled to the anode of SCR 60 by means of a commutating network 62 comprising a series combination of a commutating inductor 64, a first commutating capacitor 66, and a second commutating capacitor 68. An auxiliary capacitor 70 is coupled between the junction of commutating capacitors 66 and 68 and reference potential. A damper diode 72 is coupled in anti-parallel combination with SCR 60 to form a trace switch 73. The anode of SCR 60 is coupled through a series combination of a set of yoke windings 74 and an S-shaping capacitor 76 to reference potential. The anode of SCR 60 is also coupled through a series combination of a winding 78a of a high voltage transformer 78 and a DC blocking capacitor 80 to reference potential. A trace SCR gating network 98 comprising a resistor 278, a capacitor 280, a capacitor 282, a resistor 284, and an inductor 286 coupled between the anode electrode of SCR 54 and the gate electrode of SCR 60 provides for gating of the trace SCR 60 at the proper point in the deflection interval ($t_0 - t_0'$ of FIGS. 3 and 4).

A winding 78b of high voltage transformer 78 has a first terminal coupled to reference potential and another terminal coupled to a high voltage multiplier and rectifier 82. An output terminal 84 of high voltage multiplier and rectifier 82 is coupled to a kinescope tube (not shown). Pulses produced by winding 78b are rectified and added in high voltage multiplier and rectifier 82 to produce a high voltage direct current potential at terminal 84 required to provide the necessary beam current in the kinescope tube. A first terminal of a winding 78c is coupled to reference potential and another terminal is coupled to a horizontal oscillator and automatic phase control (APC) network 96.

Terminal K is coupled to the anode electrode of diode 86 and the cathode electrode of diode 86 is coupled through the capacitor 88 to reference potential. The cathode of diode 86 which provides a source of B+ is also coupled through a resistor 208 to terminal M. Terminal M is coupled through a parallel combination of a resistor 210 and a filter capacitor 212 to reference potential. The cathode of diode 86 is also coupled through a resistor 214 to the cathode electrode of a zener diode 216. The anode electrode of zener diode 216 is coupled to reference potential. A filter capacitor 218 is coupled in parallel with zener diode 216. The cathode electrode of zener diode 216 is coupled through a series combination of a resistor 220 and a parallel combination of a zener diode 224 and a capacitor 226 to reference potential, the cathode electrode of diode 224 being coupled to terminal 14 of a monostable 222 and the anode electrode of diode 224 being coupled to reference potential. Terminal 14 of monostable 222 is coupled through a series combination of a resistor 228 and a capacitor 230 to terminal 10 of monostable 222. The junction of resistor 238 and capacitor 230 is coupled to terminal 11 of monostable 222. An output terminal 6 of monostable 222 is coupled through a resistor 232 to the base electrode of a switching transistor 234 and through a fast discharge diode 236 to reference potential. The emitter electrode of transistor 234 is coupled through a level shifting diode 238 to reference potential. Resistor 228, capacitor 230 and the voltage at terminal 14 of monostable 222 determined the width of the logic 1 portion of the signal produced by monostable 222 at terminal 6.

The collector electrode of transistor 234, which provides a control signal which has an amplitude proportional to B+, is coupled to terminal N and through a high frequency suppression network comprising a series combination of a resistor 240 and a capacitor 242 to reference potential. Terminals 3 and 7 of monostable 222 are coupled to reference potential. Monostable 222, transistor 234 and associated circuitry comprise a modulator 90.

The cathode electrode of zener diode 216 is also coupled through a resistor 244 to terminal 1 of a horizontal oscillator and APC 96 and through a parallel combination of a high frequency bypass capacitor 246 and a low frequency filter capacitor 248 to reference potential. Terminal 16 of oscillator and APC 96 is coupled to reference potential. A sync source 92 which provides a switching signal at line deflection rate is also coupled to oscillator and APC 96 to provide for proper phasing of the signal developed at output terminal A of oscillator and APC 96 to synchronize the pulse developed by winding 78c with the synchronizing signal produced by the synchronizing source 92. Output terminal A is coupled through a series combination of an RF choke 250 and a resistor 252 to terminal 5 of monostable 222. The junction of choke 250 and resistor 252 is coupled through a resistor 254 to reference potential and through a series combination of a resistor 256 and a capacitor 258 to the base electrode of a transistor 260. The junction of resistor 256 and capacitor 258 is coupled through a capacitor 262 to reference potential. The resistor 256 and the capacitor 262 provide delay of the signal between terminal A of oscillator and APC 96 and the base electrode of transistor 260. The base electrode of transistor 260 is coupled though a resistor 264 to reference potential. The emitter electrode of transistor 260 is coupled to reference potential and the collector electrode of transistor 260 is coupled through a resistor 266 to the cathode electrode of zener diode 216 and to the base electrode of a transistor 268 by means of a resistor 270. The base electrode of transistor 268 is coupled to reference potential by means of a capacitor 272. The resistor 270 and the capacitor 272 form a pulse stretcher and give some additional delay. The emitter electrode of transistor 268 is coupled to the cathode electrode of zener diode 216 and the collector electrode of transistor 268 is coupled to reference potential by means of a resistor 274 and to the gate electrode of SCR 54 by means of a capacitor 276. Transistors 260 and 268 and associated circuitry comprise a pulse shaper and delay network 94.

The transistor 24 operating in conjunction with diode 16, capacitor 18, isolation transformer 22, diode 52, diode 86 nd capacitor 88 comprise a switching regulator. The switching regulator produces B+ which has an amplitude proportional to the duration that transistor 24 is turned on relative to the duration transistor 24 is turned off by drive signals.

Since the non-isolated portion 42 (FIG. 1) operates in conjunction with the isolated portion 44 (FIG. 2), the explanation of the operation will simultaneously consider both FIG. 1 and FIG. 2. Also, the operation will be first explained by referring to the solid curves of FIGS. 3A-3J and 4A-4J and then the dotted curves.

An alternating current source (not shown) provides an alternating current voltage which is rectified by the diode 16 and filtered by means of the capacitor 18 to develop a direct current voltage at terminal 20 with respect to earthen ground. The direct current voltage at terminal 20 provides for energization of the non-isolated portion 42 of the television receiver of FIGS. 1 and 2.

Before energy can be transferred from winding 22a to windings 22b and 22c, which provides for energization of the isolated portion 44 of the television receiver of FIGS. 1 and 2, the transistor 24 must alternately be switched off and on thereby creating an alternating flux in the core of isolation transformer 22. In the absence of such switching of transistor 24, no B+ is developed at the cathode of diode 86 and, therefore, no signal appears at terminal D of winding 40a of isolation transformer 40.

With no signal at terminal D, transistor 112 is cut off, thereby providing a logic 1 at terminal E. The logic 1 level at terminal E provides for cutoff of transistor 114. It will be assumed that the non-isolated portion 42 has previously been de-energized for a relatively long period of time; therefore, the collector electrode of transistor 114 is at earthen ground (logic 0). With the collector electrode of transistor 114 at a logic 0, the base electrode of transistor 120 is at a logic 0; therefore, transistor 120 is cut off. With the transistor 120 cut off, the collector electrode of transistor 120, the base electrode of transistor 126 and terminal 130 of dual input NAND gate 132 are at logic 1. With a logic 1 at the base electrode of transistor 126, the collector electrode is at a logic 0.

With the logic 1 at terminal E and a logic 0 at the collector electrode of transistor 126, monostable 32 is responsive; to positive transitions at terminal 5. With a logic 1 on terminal 130 of dual input NAND gate 132, terminal 5 of monostable 32 will be alternately pulsed from a logic 1 to a logic 0 at a rate determined by capacitor 138 and resistor 140.

Also, in the absence of signal on terminal D of winding 40a, the transistor 142 will be cut off; therefore, the voltage at terminal F will be at a logic 0 thereby placing transistor 160 in cutoff and transistor 162 in maximum conduction. With transistor 162 in maximum conduction, the voltage at the collector electrode of transistor 162 will be at a minimum voltage determined by the zener voltage of zener diode 174 and resistors 164 and 168. Since the voltage at the collector of transistor 162 is less than the zener voltage of zener diode 106, the charge rate of the capacitor 172 will be slower than when the transistor 162 is cut off. This slow charging rate of the capacitor 172 provides for a minimum duration logic 1 pulse (maximum monostable period) being produced by the monostable 32 at output terminal H when no signal is present at terminal D.

Transitions from a logic 0 to a logic 1 at terminal 5 of monostable 32 provided by the auxiliary oscillator 26 produce a transition from logic 1 to a logic 0 at terminal H and a negative transition at terminal G. As the capacitor 172 charges through resistor 168, the voltage at terminal G begins to become more positive. When the voltage at terminal G reaches a threshold voltage level established by the characteristics of monostable 32, a transition from a logic 0 to a logic 1 occurs at terminal H.

Figure 3A:
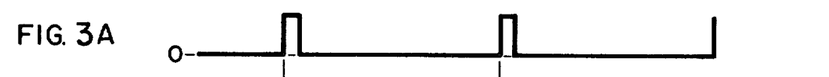
FIGS. 3A–3J illustrate normalized waveforms obtained at various points in the diagram of a first embodiment of FIG. 1 and the diagram of FIG. 2.
Figure 3B:
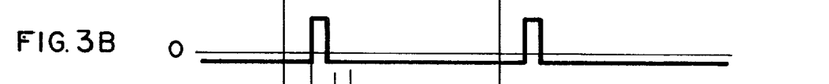
Figure 3C:
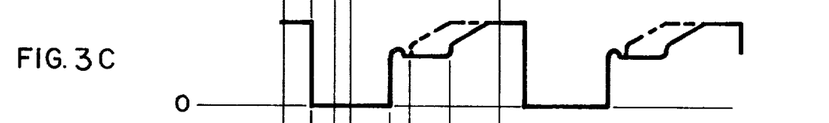
Figure 3D:
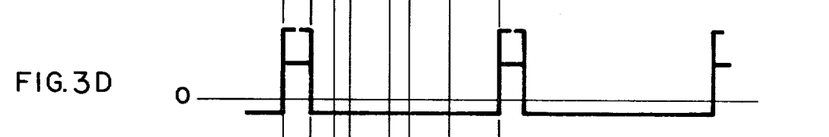
Figure 3E:
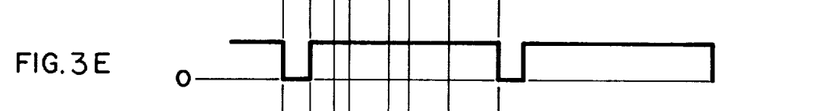
Figure 3F:
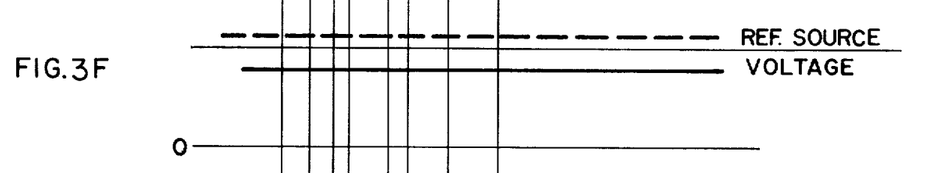
Figure 3G:
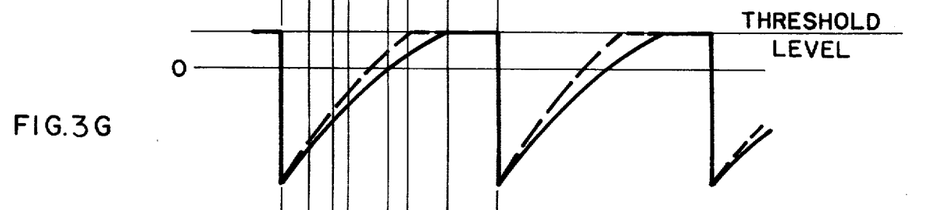
Figure 3H:
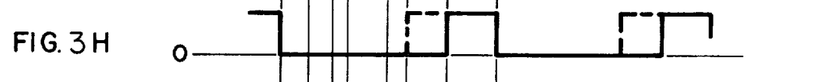
Figure 3I:
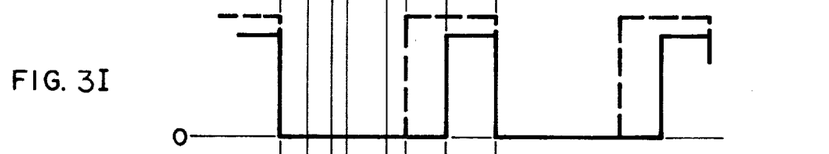

Transitions from a logic 1 to a logic 0 at terminal H, as shown at $T_0$ in FIG. 3H, provide for a cutoff of the transistor 182 and the production of a positive voltage at the base electrode of transistor 24 with respect to earthen ground. With a positive voltage at the base electrode of transistor 24, current flows from terminal 20 through winding 22a of isolation transformer 22 and transistor 24 to earthen ground. The current flowing through winding 22a during the saturation of transistor 24 produces a logic 0 at terminal I as shown in FIG. 3I and a negative potential at terminal J and terminal K with respect to terminal L of windings 22b and 22c similar to that shown in FIG. 3J.

When the signal at terminal H of monostable 32 makes a transition from a logic 0 to a logic 1, as shown at $t_6$ in FIG. 3H, transistor 182 is placed in saturation, thereby producing a negative potential at the base electrode of transistor 24 with respect to earthen ground. With a negative potential at the base electrode of transistor 24, transistor 24 is cut off, thereby providing for a collapse of the field developed in isolation transformer 22 during saturation of transistor 24. The collapse of field in isolation transformer 22 produces a positive voltage at terminals J and K with respect to terminal L of winding 22b and 22c similar to that shown in FIG. 3J.

Figure 3J:
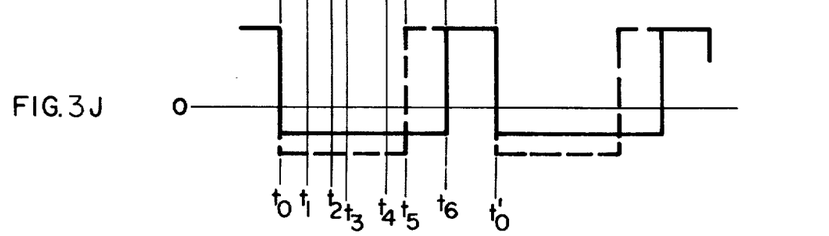

With a signal similar to that shown in FIG. 3J being produced at terminal J and K of windings 22b and 22c, a pulsating direct current voltage is developed at terminal C and B+ is developed at the cathode of diode 86. With B+ being developed at the cathode of diode 86, oscillator and APC 96 starts producing a signal similar to that shown in FIG. 3A at terminal A. The signal at output terminal A of oscillator and APC 96 provides for triggering of the monostable 222, thereby providing a signal at terminal 6 of monostable 222 similar to that shown in FIG. 3D but of constant amplitude. The signal at terminal 6 of monostable 222 provides for switching of transistor 234 and the production of a waveform at terminal D as shown in FIG. 3D. The amplitude of the signal at terminal D is directly proportional to the amplitude of the B+ produced at the cathode of diode 86. The signal at terminal A of oscillator and APC 96 is shaped and delayed by shaper and delay network 94, thereby providing a gating signal at terminal B as shown in FIG. 3B. In addition, due to choice of components in pulse shaper and delay network 94 and modulator 90, pulses are developed at terminal D of transformer 40 before pulses are produced at terminal B during initial start-up of the power supply (i.e., prior to $t_0$).

The transition from a logic 0 to a logic 1 at output terminal B of pulse shaper and delay 94 occurs at $t_1$ as shown in FIG. 3B, thereby providing for assurance that the commutating switch 58 is not turned on until after the voltage at terminal J goes negative. The voltage at terminal J remains negative for an interval $t_0 - t_6$. Since the commutating switch 58 ceases conduction at $t_4$ as shown in FIG. 3C, no significant current flows through the diode 52 during conduction of commutating switch 58. The deflection system 53 operates similar to that described in U.S. Pat. No. 3,452,244 and thereby produces pulses across winding 78c which, when coupled to the oscillator and APC 96 and compared to signals produced by the sync source 92, produce a signal at output terminal A which maintains synchronization of the signals produced by the sync source 92 and the pulses across winding 78c.

At $t_0$ a positive pulse is initiated at terminal D of winding 40a. The initiation of the positive pulse provides for saturation of transistor 112 by way of resistor 146, thereby providing a logic 0 at terminal E. The logic 0 at terminal E provides for base-emitter current in the transistor 114 by way of resistor 113, resulting in saturation of transistor 114. With transistor 114 in saturation, the voltage at the collector of transistor 114 is at a logic 1. With a logic 1 at the collector electrode of transistor 114, the transistor 120 is placed in saturation by means of base-emitter current flow produced by resistor 122. With transistor 120 in saturation, the voltage at terminal 130 of dual input NAND gate 132 is at a logic 0 and the base electrode of transistor 126 is at a logic 0. With a logic 0 at terminal 130 of dual input NAND gate 132, the auxiliary oscillator 26 is disabled, thereby maintaining a logic 1 at the output of dual input NAND gate 132. With the logic 0 at the base electrode of transistor 126, the collector electrode of transistor 126 at a logic 1 and the output of dual input NAND gate 132 at a logic 1, the monostable 32 produces a transition from a logic 1 to a logic 0 at output terminal H, as shown in FIG. 3H, when a transition from a logic 0 to a logic 1 occurs at terminal D of winding 40a, as shown at $t_0$ in FIG. 3D.

By altering the time constant of the integrator of the peak detector 30, two different modes of operation can be obtained. Each of these modes of operation will be considered as a separate embodiment of a non-isolated portion 42 of the television receiver.

A first embodiment utilizes an integrator having a time constant very much longer than the pulse repetition rate ($t_0 - t_0'$) of the oscillator and APC 96. With the long time constant, the positive pulses at terminal D of winding 40a produce a voltage across capacitor 152 which is nearly constant and is approximately equal to the maximum amplitude of the positive pulses at terminal D. A voltage proportional to the voltage across capacitor 152 is therefore produced at terminal F and is as shown in FIG. 3F.

Assuming that the amplitude of the positive pulse at terminal D is within the predetermined range to which voltage comparator 34 is responsive, the voltage at the collector of transistor 162 is proportional to the voltage at terminal F.

At $t_0$ the voltge at terminal G of monostable 32 goes negative as shown in FIG. 3G. After $t_0$, the voltage at terminal G begins to increase at an exponential rate determined by the voltage at the collector of transistor 162. When the voltage at terminal G reaches the threshold level established by the characteristics of the monostable 32, the output terminal H of monostable 32 makes a transition from a logic 0 to a logic 1 as shown in FIG. 3H at $t_6$.

Transitions at terminal H produce corresponding transitions at terminals I, J and K as described above under conditions whereby the auxiliary oscillator 26 is operational. The transitions at terminals I, J and K provide for operation of the deflection system 53 and production of B+ at the cathode of diode 86, thereby maintaining operation of the isolated portion 44.

Components of modulator 90 and pulse shaper and delay 94 are chosen to delay the production of gating pulses at terminal B during the transient period until positive pulses at terminal C have a proper phase relationship with respect to the signals produced by the sync source to prevent current flow through diode 52 during conduction of the commutating switch 58. The aforementioned delay prevents excessive current flow through diode 52 during the start-up of power supply.

When B+ increases, the pulse amplitude at terminal D increases as shown by the dotted curve of FIG. 3D, a larger voltage is produced at terminal F as shown in FIG. 3F, and the voltage at terminal G reaches the threshold level at $t_5$ rather than $t_6$. With the voltage at terminal G reaching the threshold level faster, the time duration during which the voltage at terminals H, I, J and K are at a logic 0 is less during each deflection interval. This change at terminals J and K results in a drop of the peak voltage at terminal J and the B+ to the levels produced by the solid curves of FIG. J even though the peak-to-peak voltage at terminals J and K is greater than under the original conditions. By maintaining a relatively constant peak voltage at terminal J and a relatively constant B+, the operation of the isolated portion 44 is maintained relatively uniform.

A second embodiment utilizes an integrator having a time constant which is shorter than the pulse repetition rate of the oscillator and APC 96. With the short time constant, the positive pulse at terminal D of winding 40a produces a voltage at the emitter electrode of transistor 142 which is approximately equal to the maximum amplitude of the positive pulse produced at terminal D during the interval $t_0 - t_1$. A voltage proportional to the voltage at the emitter electrode of transistor 142 is produced at terminal F. At $t_0$ a voltage is developed at terminal F which is in excess of the zener voltage of the zener diode 174. This condition produces maximum conduction of transistor 160 and cutoff of transistor 162. With transistor 162 in cutoff, the collector electrode of transistor 162 is at a potential approximately equal to the zener voltage of zener diode 106, thereby providing for a relatively fast charging of capacitor 172 from the level at $t_0$ as shown in FIG. 4G.

Figure 4A:
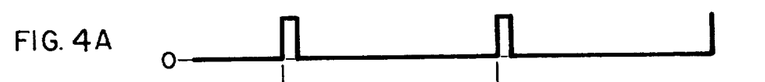
FIG. 4A–4J illustrate normalized waveforms obtained at various points in the diagram of a second embodiment of FIG. 1 and the diagram of FIG. 2.
Figure 4B:
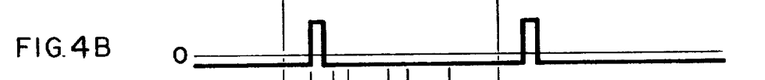
Figure 4C:
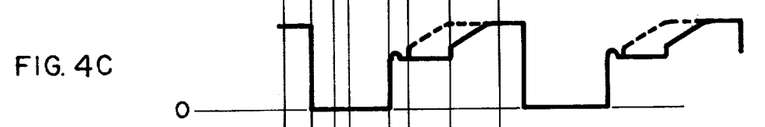
Figure 4D:
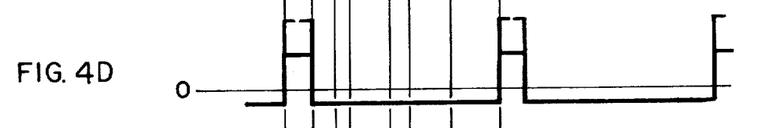
Figure 4E:
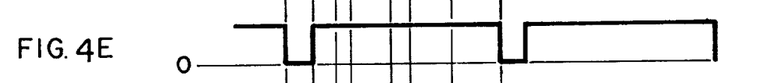
Figure 4F:
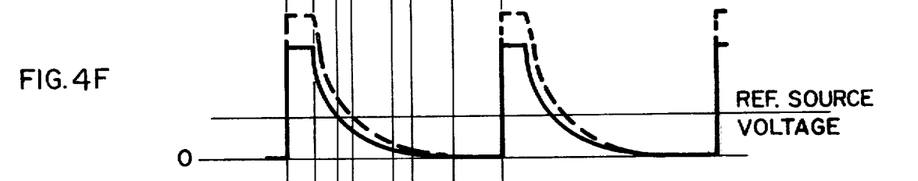
Figure 4G:
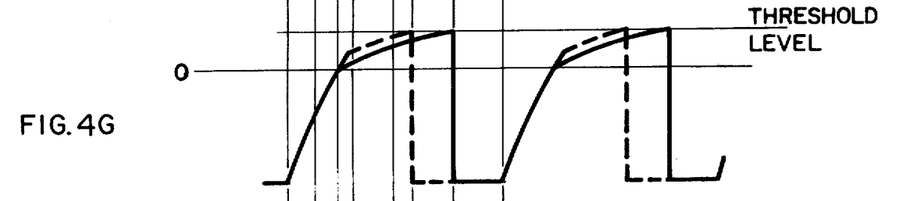

The point at which the voltage at terminal G reaches the threshold level as shown in FIG. 4G determines when the signal at output terminal H of monostable 32 makes a transition from a logic 0 to a logic 1.

At $t_1$ the voltage at terminal D goes negative, providing for cutoff of transistor 112 and a logic 1 at terminal E. With a logic 1 at terminal E, transistor 114 is placed in cutoff and capacitor 116 begins to discharge through the resistor 118 and through the series combination of resistor 122 and the base-emitter junction of transistor 120. Due to the repetition rate of the pulses produced at terminal D of winding 40a of isolation transformer 40 relative to the time constant of the capacitor 116, resistor 118 and resistor 122, the voltage at the collector electrode of transistor 114 will not drop below a level which will sustain saturation of transistor 120 between pulses produced at terminal D. Therefore, terminal 130 of dual input NAND gate 132 will remain at a logic 0 and the output of NAND gate 132 will remain at a logic 1.

Figure 4H:
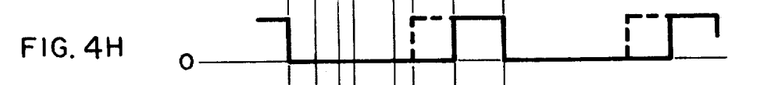
Figure 4I:
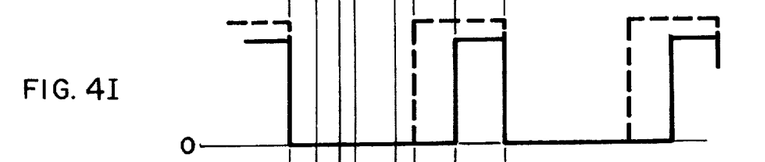
Figure 4J:
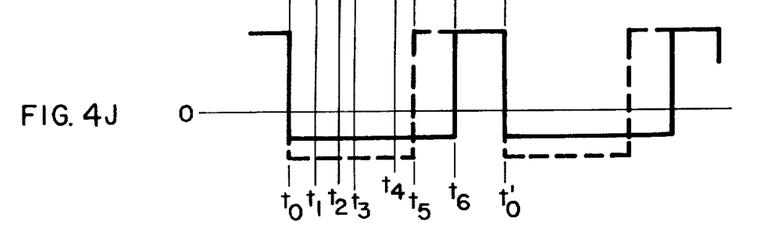

With the negative voltage at terminal D of winding 40a, the transistor 142 will be cut off and the capacitor 152 will begin to discharge through the resistors 154, 156 and 158 as shown in FIG. 4F between $t_1$ and $t_6'$. At $t_2$, the voltage at terminal F is equal to the zener voltage of zener diode 174. When the voltage at terminal F drops just below this level, transistor 160 cuts off and transistor 162 is placed in maximum conduction. During the interval $t_2 - t_6$, the transistor 162 remains in maximum conduction and the rate of charging of capacitor 172 is less than the rate of charging of capacitor 172 with transistor 162 in cutoff, as shown in FIG. 4G. At $t_6$ the signal at output terminal H makes a transition from logic 0 to logic 1 as shown in FIG. 4H as a result of the voltage at terminal G reaching the threshold level as shown in FIG. 4G.

Positive and negative transitions at output terminal H of monostable 32 produce positive and negative transitions at termial I and terminal J as described above under conditions whereby the auxiliary oscillator 26 is operational.

When the pulse amplitude at the terminal D of winding 40a increases as shown in dotted curve of FIG. 4D, the maximum amplitude of the voltage at terminal F increases as shown in FIG. 4F. This change of maximum voltage at terminal F increases the time during which capacitor 172 is charged at the faster rate as shown in FIG. 4G and decreases the total time for charging capacitor 172 to the threshold level. This decrease in total time for charging the capacitor 172 to the threshold level decreases the duration during which terminal H of monostable 32 is at a logic 0 as shown in FIG. 4H and decreases the duration of saturation of the transistor 24 which provides for compensation for an increase of direct current voltage at terminal 20 which initially produced an increase of the pulse amplitude at terminal D as shown in FIG. 4D. This compensation can be seen by referring to FIG. 4J where it can be seen that the positive peak voltage remains approximately the same due to change of saturation period of the transistor 24 in response to an increase of the pulse amplitude at terminal D of winding 40a.

The power supply of the television receiver as described above provides for regulation of b+, synchronization of the switching transistor 24 at the line rate to reduce interference, isolation of the alternating current source from operator accessible components coupled to reference potential and elimination of the input reactor of the deflection system 53 by providing synchronization of B+ with conduction of the commutating switch 58.

One particular configuration corresponding to that illustrated in FIGS. 1 and 2 is set forth below in terms of component types.

| Monostable 32 | SN74121 Texas Instruments |
| Oscillator and APC 96 | TBA920 Philips |
| Monostable 222 | SN74121 Texas Instruments |

What is claimed is:

1. A synchronized and regulated power supply comprising;

switching regulator means adapted to be coupled to a source of alternating current potential for producing a direct current potential having an amplitude proportional to the duration of a first drive signal condition relative to the duration of a second drive signal condition;

oscillating means adapted to be coupled to a source of synchronizing signals for producing a switching signal having a first predetermined phase offset relationship with respect to said synchronizing signals;

modulating means coupled to said switching regulator means and said oscillating means for producing a control signal having a second predetermined phase offset relationship with respect to said switching signal and having an amplitude which is proportional to the amplitude of said direct current potential; and means including a drive signal generator coupled to said modulating means and said switching regulator means for initiating the production of said first drive signal condition in response to the initiation of said control signal and for controlling the duration of said first drive signal condition relative to the duration of said second drive signal condition in response to the amplitude of said control signal.

2. A synchronized and regulated power supply according to claim 1 wherein said modulating means includes:

means coupled to said oscillating means for producing said control signal for a first predetermined duration, said control signal having said second predetermined phase relationship with respect to said switching signal; and amplifying means coupled to said means for producing said control signal and said switching regulator for controlling the amplitude of said control signal for said first duration in response to said direct current potential.

3. A synchronized and regulated power supply according to claim 2 wherein said means including a drive signal generator includes:

first peak detecting means coupled to said modulating means for producing a control voltage proportional to the peak amplitude of said control signal;

a reference voltage source;

voltage comparing means coupled to said first peak detecting means and said reference source for producing a charging voltage proportional to said control voltage; and monostable means coupled to said voltage comparing means, said modulating means and said switching regulator for initiating the production of said first drive signal condition in response to the initiation of said control signal and for initiating the production of said second drive signal condition when a voltage produced by said charging voltage equals a predetermined voltage.

4. A synchronized and regulated power supply according to claim 2 wherein said means including a drive signal generator includes:

first peak detecting means coupled to said modulating means for producing a control voltage equal to the peak amplitude of said control signal during said first duration and providing for a reduction of said control voltage at a predetermined rate subsequent to said first duration;

a reference voltage source;

voltage comparing means coupled to said first peak detecting means and said reference source for producing a first charging voltage when said control voltage is greater than said reference voltage and a second charging voltage when said control voltage is less than said reference voltage; and monostable means coupled to said voltage comparing means, said modulating means and said switching regulator for initiating the production of said first drive signal conditin in response to the initiation of said control signal and for initiating the production of said second drive signal condition when a voltage produced by said first and second charging voltages equals a predetermined voltage.

5. A synchronized and regulated power supply comprising:

switching regulator means adapted to be coupled to a source of alternating current potential for producing a direct current potential having an amplitude proportional to the duration of a first drive signal condition relative to the duration of a second drive signal condition;

oscillating means adapted to be coupled to a source of synchronizing signals for producing a switching signal having a first predetermined phase relationship with respect to said synchronizing signals;

modulating means coupled to said switching regulator means and said oscillating means, said modulating means including:

means coupled to said oscillating means for producing a control signal for a first predetermined duration, said control signal having said second predetermined phase relationship with respect to said switching signal; and amplifing means coupled to said means for producing said control signal and said switching regulator for controlling the amplitude of said control signal for said first duration in response to said direct current potential;

means including a drive signal generator coupled to said modulating means and said switching regulator means, including:

first peak detecting means coupled to said modulating means for producing a control voltage proportional to the peak amplitude of said control signal;

a reference voltage source;

voltage comparing means coupled to said first peak detecting means and said reference source for producing a charging voltage proportional to said control voltage; and monostable means coupled to said voltage comparing means, said modulating means and said switching regulator for initiating the production of said first drive signal condition in response to the initiation of said control signal and for initiating the production of said second drive signal condition when a voltage produced by said charging voltage equals a predetermined voltage; and an auxiliary oscillator means coupled to said monostable means for repetitively initiating said first drive signal condition when said direct current potential is less than a predetermined amplitude.

6. A synchronized and regulated power supply according to claim 5 wherein said means includes an isolation transformer for providing isolated coupling between said modulating means and said means including a drive signal generator.

7. A synchronized and regulated power supply comprising:

switching regulator means adapted to be coupled to a source of alternating current potential for producing a direct current potential having an amplitude proportional to the duration of a first drive signal condition relative to the duration of a second drive signal condition;

oscillating means adapted to be coupled to a source of synchronizing signals for producing a switching signal having a first predetermined phase relationship with respect to said synchronizing signals;

modulating means coupled to said switching regulator means and said oscillator means, said modulating means including:

means coupled to said oscillating means for producing a control signal for a first predetermined duration, said control signal having said second predetermined phase relationship with respect to said switching signal; and amplifying means coupled to said means for producing said control signal and said switching regulator for controlling the amplitude of said control signal for said first duration in response to said direct current potential;

means including a drive signal generator coupled to said modulating means and said switching regulator means, first peak detecting means coupled to said modulating means for producing a control voltage equal to the peak amplitude of said control signal during said first duration and providing for a reduction of said control voltage at a predetermined rate subsequent to said first duration;

a reference voltage source;

voltage comparing means coupled to said first peak detecting means and said reference source for producing a first charging voltage when said control voltage is greater than said reference voltage and a second charging voltage when said control voltage is less than said reference voltage; and monostable means coupled to said voltage comparing means, said modulating means and said switching regulator for initiating the production of said first drive signal condition in response to the initiation of said control signal and for initiating the production of said second drive signal condition when a voltage produced by said first and second charging voltages equals a predetermined voltage; and an auxiliary oscillator means coupled to said monostable means for repetitively initiating said first drive signal condition when said direct current potential is less than a predetermined amplitude.

8. A synchronized and regulated power supply according to claim 7 wherein said means including a drive signal generator further includes an isolation transformer for providing isolated coupling between said modulating means and said means including a drive signal generator.

9. A synchronized and regulated power supply, comprising:

switching regulator means adapted to be coupled to a source of alternating current potential for producing a direct current potential and a pulsating direct current having amplitudes proportional to the duration of a first drive signal condition relative to the duration of a second drive signal condition;

oscillating means adapted to be coupled to a source of synchronizing signal for producing a switching signal having a first predetermined phase offset relationship with respect to said synchronizing signals;

modulating means coupled to said switching regulator means and said oscillating means for producing a control signal having a second predetermined phase offset relationship with respect to said switching signal and having an amplitude which is proportional to the amplitude of said direct current potential;

means including a drive signal generator coupled to said modulating means and said switching regulator means for initiating the production of said first drive signal condition in response to the initiation of said control signal and for controlling the duration of said first drive signal condition relative to the duration of said second drive signal condition in response to the amplitude of said control signal;

delay means coupled to said oscillating means for producing a delayed switching signal; and deflection means coupled to said switching regulator means, said delay means, and said oscillating means for producing repetitive deflection cycles having a third predetermined phase relationship with respect to said synchronizing signals such that the current only flows between said switching regulator means and said deflection means during an energy replenishing period of said deflection cycle.

* * * * *

UNITED STATES PATENT OFFICE
CERTIFICATE OF CORRECTION

PATENT NO. : 4,002,965

DATED : January 11, 1977

INVENTOR(S) : Willem den Hollander

It is certified that error appears in the above-identified patent and that said Letters Patent are hereby corrected as shown below:

Column 12, line 30, that portion reading "conditin" should read -- condition --; Column 13, line 19, after "means" and before "includes" insert -- including a drive signal generator further --.

Signed and Sealed this

Tenth Day of May 1977

[SEAL]

Attest:

RUTH C. MASON
*Attesting Officer*

C. MARSHALL DANN
*Commissioner of Patents and Trademarks*